United States Patent [19]
Ito et al.

[11] 3,971,048

[45] July 20, 1976

[54] EXPOSURE VALUE DISPLAY SYSTEM FOR A CAMERA

[75] Inventors: Tadashi Ito, Yokohama; Soichi Nakamoto, Machida; Youichi Okuno, Yokohama, all of Japan

[73] Assignee: Canon Kabushiki Kaisha, Tokyo, Japan

[22] Filed: Sept. 30, 1974

[21] Appl. No.: 510,711

[30] Foreign Application Priority Data

Oct. 2, 1973 Japan.............................. 48-110731

[52] U.S. Cl. ............................ 354/60 L; 356/226; 356/227
[51] Int. Cl.[2] ...................... G01J 1/44; G03B 17/20
[58] Field of Search................. 354/23 R, 23 D, 50, 354/51, 60, 60 E, 60 L, 53, 54, 56; 356/218, 226, 227

[56] References Cited
UNITED STATES PATENTS

| | | | |
|---|---|---|---|
| 3,812,503 | 5/1974 | Engelsmann et al. | 354/60 L |
| 3,818,495 | 6/1974 | Sagara et al. | 354/60 L |

Primary Examiner—Joseph F. Peters, Jr.
Attorney, Agent, or Firm—Toren, McGeady and Stanger

[57] ABSTRACT

In a single lens reflex camera equipped with a shutter time preselection-automatic exposure range and a diaphragm aperture preselection-automatic exposure range, the drive circuits of a light-sensor and a digit readout assembly arranged in the view finder are controlled in time-spaced relation to each other by timing signals. These signals in turn are controlled by a train of clock pulses to alternately bring the sensor and the digit readout assembly into sequential operation. In this manner, the light value as sensed by the sensor is not affected by any part of the light from the energized digit readout assembly.

5 Claims, 5 Drawing Figures

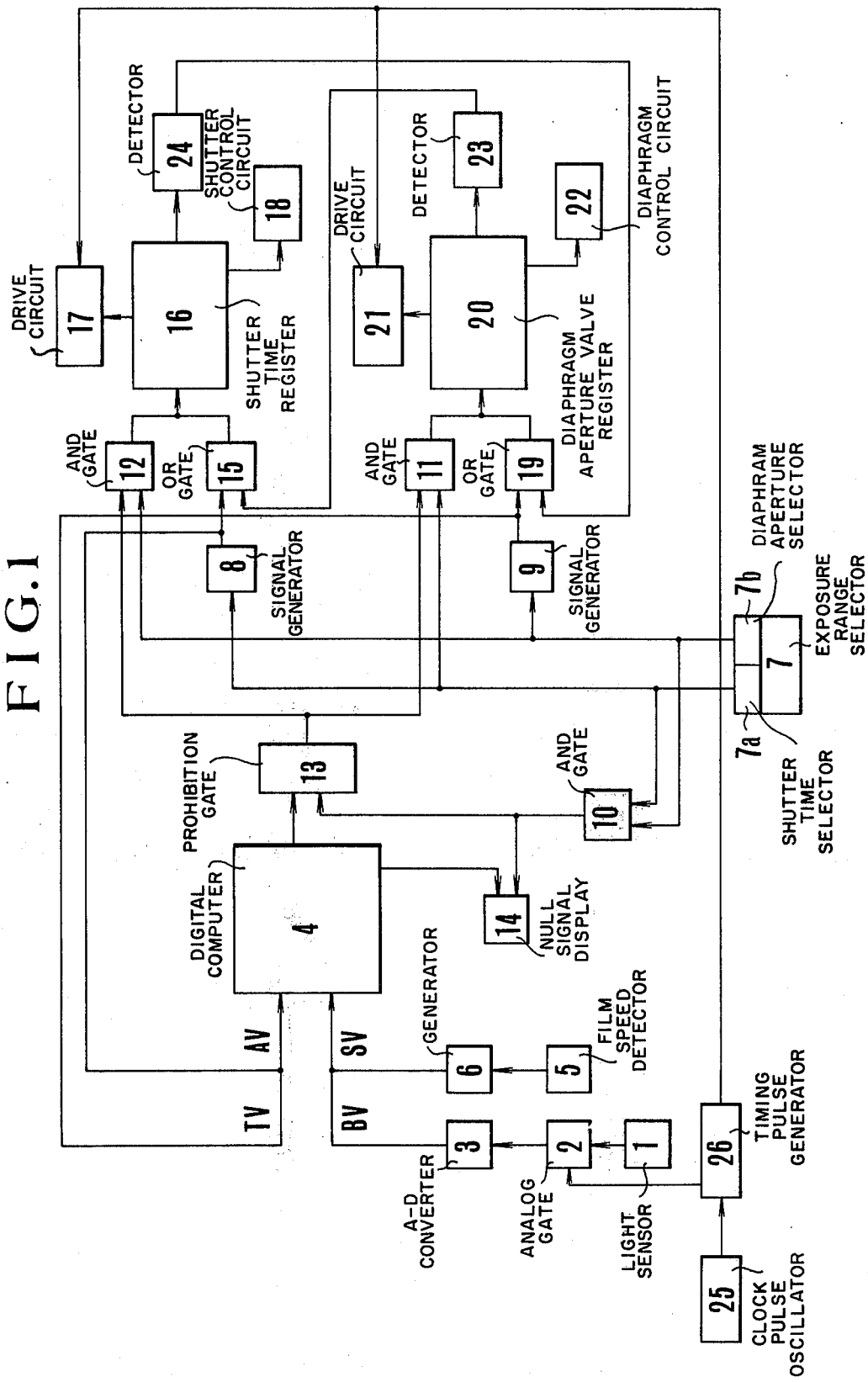

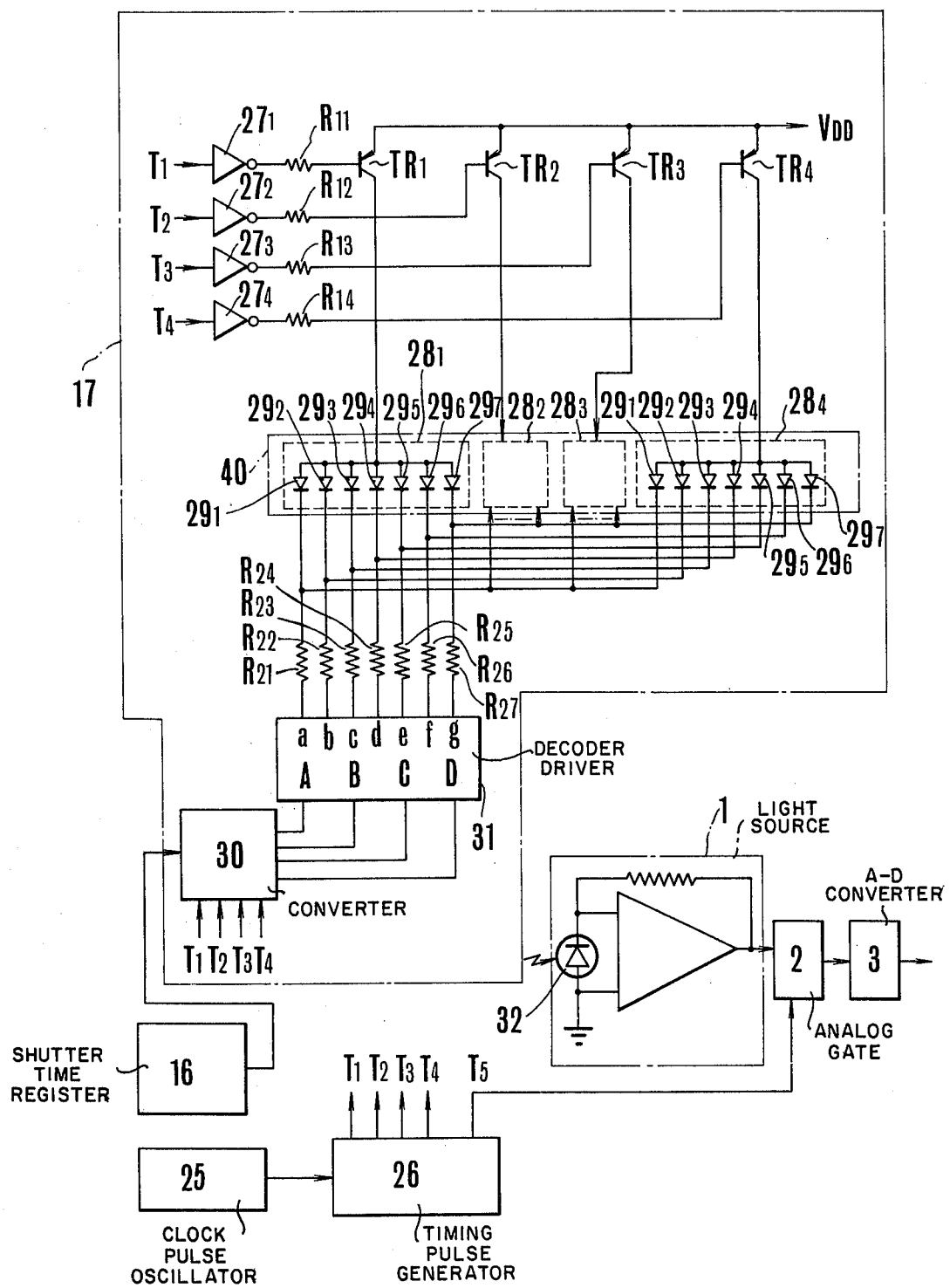

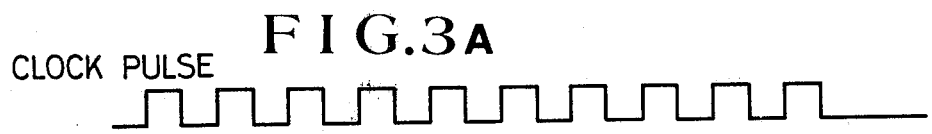
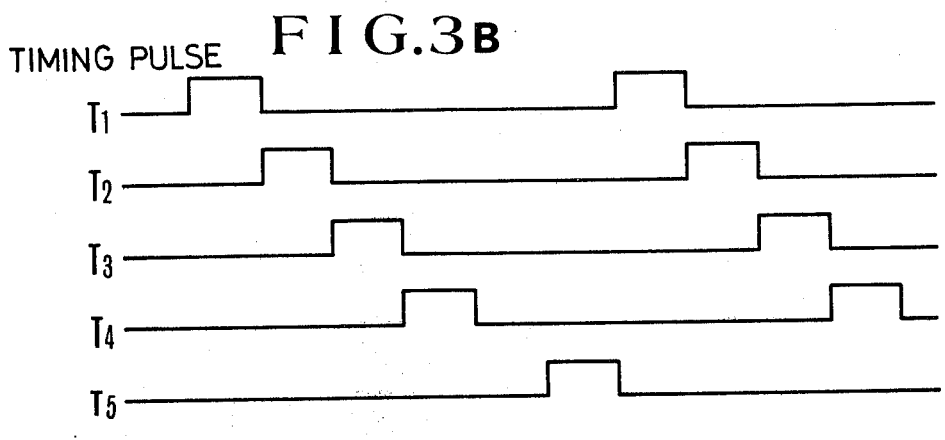
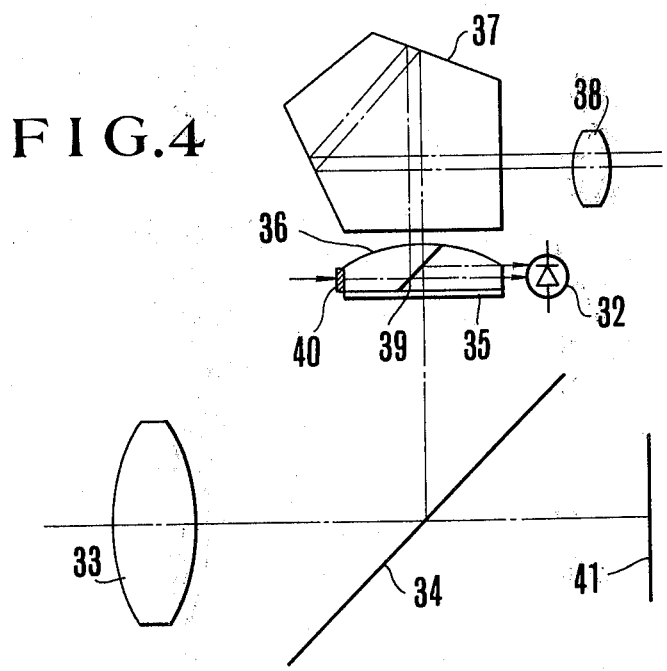

EXPOSURE VALUE DISPLAY SYSTEM FOR A CAMERA

BACKGROUND OF THE INVENTION

1. Field of the Invention:

This invention relates to an exposure value display system for a photographic camera of TTL type equipped with an automatic exposure control apparatus, wherein a light-sensor and a digit readout assembly are arranged in the view finder thereof.

2. Description of the Prior Art:

Recently there has been developed for a photographic camera an exposure value display system for displaying photographic information representative of effective diaphragm aperture and shutter time by means of a luminous digit readout device such as light-emittable diodes or substances such as liquid crystals arranged in the view finder of the camera.

Such an arrangement of light-emittable diodes, however, can not be employed in cameras of the TTL type without introducing some error to the light value as sensed by the sensor which is arranged in the view finder to receive the light from an object being photographed, because part of the light from the luminous readout device is permitted to impinge upon the sensor as a direct, indirect or stray light. Also the arrangement of the liquid crystal between the focusing screen of the view finder and the sensor results in derivation of an erroneous light value as a result of variation of transmittance of the focusing screen.

BRIEF SUMMARY OF THE INVENTION:

An object of the present invention is to eliminate the above-mentioned drawbacks and to provide an exposure value display system which permits operation of the digit readout device without causing part of the light from the energized digit readout device to exert any influence on the light value sensed by the sensor.

This is achieved by bringing the sensor and the readout device into alternate and sequential operations.

BRIEF DESCRIPTION OF THE DRAWINGS:

The present invention will be more readily understood from the following detailed description taken in conjunction with the accompanying drawings in which;

FIG. 1 is a block diagram of a digital exposure control system for a camera embodying one form of the invention.

FIG. 2 is a schematic diagram, partially in block form, of circuitry suitable for use in the display and sensor blocks of FIG. 1.

FIG. 3A graphically illustrates a wave form occurring upon the operation of the clock pulse oscillator of FIGS. 1 and 2.

FIG. 3B graphically illustrates pulse timing relationships developed during operation of the timing pulse generator of FIGS. 1 and 2.

FIG. 4 is a schematic sectional view of a view finder having a light-receiving element and a display device arranged therein.

DESCRIPTION OF THE PREFERRED EMBODIMENT:

Referring to FIG. 1, an exposure value display system embodying one form of the present invention is illustrated in association with a digital exposure control system. The exposure control system comprises a sensor 1 for providing a voltage proportional to the level of brightness of an object being photographed of which the output is connected through an analog gate 2 to an analog to digital converter 3. This AD converter 3 converts the analog signal from the sensor 2 to a digital signal which, as the object brightness information signal BV, is directed to a digital computer 4. A film speed selector, designated by the block 5, is connected to a first signal generator 6 for generating a signal with magnitude dependent upon the preselected film sensitivity, the signal as the film speed information signal SV being directed to the computer 4. A preselective exposure range selector 7 comprises a shutter time selector 7a and a diaphragm aperture selector 7b. The output of the selector 7a is connected to a second signal generator 8 for generating a signal with magnitude dependent upon the preselected shutter time, the signal as the shutter time information signal TV being directed to the computer 4. The output of the selector 7b is connected to a third signal generator 9 for generating a signal with magnitude dependent upon the preselected diaphragm aperture value, the signal as the diaphragm aperture information signal AV being directed to the computer 4. There are provided three AND gates 10, 11 and 12, the first inputs of AND gates 10 and 11 being connected to the output of selector 7a, the second input of AND gate 10 and the first input of AND gate 12 being connected to the output of selector 7b, and the second inputs of AND gates 11 and 12 being connected through a prohibition gate 13 to an output of the computer 4. The output of AND gate 10 is connected to the gating control input of prohibition gate 13 so that when the "and" condition of AND gate 10 is removed, the output of the computer 4 during this interval is prohibited from passing through the gate 13 to the second inputs of AND gates 11 and 12. The computer 4 is designed to provide a null signal which is applied to an input of a null signal display device 14, the device 14 having another input connected to the output of AND gate 10 so that the device 14 is rendered operative by the output of AND gate 10 to display the null signal in the form of light in response to the null signal output of the computer 4. There are further provided two OR gates 15 and 19. OR gate 15 has an input connected to the output of the shutter time signal generator 8 and having an output connected to both an input of a shutter time register 16 and the output of AND gate 12. OR gate 19 has an input connected to the output of the diaphragm aperture signal generator 9 and having an output connected to both an input of a diaphragm aperture value register 20 and the output of AND gate 11. The shutter time register 16 has three output terminals, one of which is connected to a drive circuit 17 for a shutter time readout device, another terminal which is connected to a shutter control circuit 18 and the third is connected to an input of a detector 24 for detecting whether or not the registered shutter time is within the range predetermined in conformance with the preselectable diaphragm aperture values, the detector 24 having an output connected to the other input of OR gate 19 so that when the registered shutter time falls outside the aforesaid predetermined conformance rance, the preselected diaphragm aperture value is automatically modified to conform with the registered shutter time. The diaphragm aperture value register 20 also has three output terminals, one of which is connected to a drive circuit 21 for a diaphragm aperture value readout device, another terminal which is connected to a diaphragm control circuit 22, and the third is connected to an input of a detector 23 for detecting whether or not the registered diaphragm aperture value is within the range predetermined in conformance with the preselectable shutter speeds, the detector 23 having an output connected to the other input of OR gate 15. The detector 23 is similar in operation to the detector 24.

A clock pulse oscillator 25 is provided to produce a train of evenly-spaced pulses at a predetermined frequency as shown in waveform A of FIG. 3. Responsive to the output pulses from the oscillator 25, a timing pulse generator 26 generates a number of pulse trains, in this instance, five pulse trains T1, T2, T3, T4 and T5 at reduced pulse frequencies equal to one another as shown in the timing chart of FIG. 3B. The pulse trains T1, T2, T3 and T4 are applied to the drive circuits 17 and 21 for the shutter time and diaphragm aperture readout devices. The pulse train T5 is applied to the analog gate 2. The pulses in the pulse trains T1 through T4 are time-displaced with respect to the pulses in the pulse train T5 long enough for the luminous elements of the readout devices to be completely quenched before the sensor 1 is brought into operation by occurrence of each pulse in the pulse train T5.

Referring to FIG. 2, the dot-dashed-line enclosures 1 and 17 enclose the components of the sensor and the drive circuit for a shutter time digit readout device designated by the blocks 1 and 17 in FIG. 1 respectively. The same parts as those in FIG. 1 are indicated by like reference characters. These components in block 17 include four inverters $27_1$ through $27_4$ to which the pulse trains T1 through T4 are respectively applied, and which are connected through respective resistors R11 through R14 to the base electrodes of respective transistors TR1 through TR4. The emitter electrodes of transistors TR1 through TR4 are connected to respective display elements such as light-emitting diodes $28_1$ through $28_4$, each display element being composed of seven crystal segments $29_1$ through $29_7$ arranged in the shape of a numerical character 8 so that digits 0 through 9 can be displayed in a manner known in the art. These display elements $28_1$ through $28_4$ constitute part of a digit readout device 40 for the shutter time registered in the register 16. The seven crystal segments $29_1$ through $29_7$ in each of the display elements $28_1$ through $28_4$ are connected through respective resistors $R_{21}$ through $R_{27}$ to a seven segment decoder driver 31 to which the four pulse trains T1 through T4 are applied through a converter 30 having an input connected to the register 16. The drive circuit 21 for the diaphragm aperture value readout device is identical in construction and arrangement of the components to the drive circuit 17 for the shutter time readout device. The components in the sensor 1 include a light-receiving element 32 such as a photodiode, arranged in a view finder to receive light from an object being photographed, and a logarithmic converter associated with the light-receiving element 32. The output of the logarithmic converter is connected to the AD converter 3 through the analog gate 2 having a gating control input connected to the timing pulse generator 26 so that upon occurrence of each pulse in the pulse train T5, the gate 2 is gated on during the pulse interval to pass the output of the sensor 1 to the AD converter 3.

FIG. 4 illustrates an arrangement of the basic elements of a single lens reflex camera without a housing. Located between an objective lens 33 and a film plane 41 is a tiltable mirror 34 which reflects light entering through the lens 33 upward onto a focusing screen 35 where an image of the object to be photographed is formed. Light from the image on the screen 35 is radiated upward through a condenser lens 36 into a penta-prism 37 and directed therethrough to an eye-piece 38, reaching an eye of the camera operator looking through the view finder. The condenser lens 36 is provided with a half-mirror 39 which deflects part of the light onto the light-receiving element 32, the same being arranged at a side of the condenser lens 36. Arranged on the opposite side of the condenser lens 36 to the light-receiving element 32 is a display device 40, and the light from the display device 40 is reflected by the half mirror 39 to the penta-prism 37 and therefrom directed to the eye-piece 38 reaching the eye of the operator looking through the view finder.

The operation of the associated systems of FIG. 1 and FIG. 2 for the shutter time preselection automatic exposure range is as follows. At first, the camera operator throws a battery switch to render operative the clock pulse oscillater 25. Responsive to a train of clock pulses in a wave-form of FIG. 3A, the timing pulse generator 26 delivers five pulse trains T1 through T5 in the timed relation as shown in FIG. 3B, the pulse trains T1 through T4 being directed to the drive circuits 17 and 21, and the pulse train T5 being directed to the analog gate 2. Next the camera operator turns a shutter dial not shown associated with the shutter time selector 7b to select a desired shutter time. Thereupon, a signal is applied from the selector 7a both to AND gates 10 and 11 and to the shutter time signal generator 8. The generator 8 generates a certain number of pulses which depends on the shutter time determined by the selector 7a. These output pulses are applied as the shutter time information to computer 4 and OR gate 15. The OR gate 15 passes the pulses to the shutter time register 16 which in turn operates to set the shutter control circuit 18 to an operative condition for the selected shutter time formation, and to actuate the drive circuit 17. Upon actuation of the drive circuit 17, the crystal segments $29_1$ through $29_7$ in the digit readout device 40 are selectively energized in sequence by combining the outputs of the transistors TR1 through TR4 which are activated in response to timed application of the pulse trains T1 through T4 with the outputs from the decoder driver 31 which are controlled in timed relation by the converter 30 responsive to the shutter time information from the register 16. In this manner, the display elements $28_1$ through $28_4$ displaying respective digits are selected from the ten digits from 0 to 9 to form an indicium representative of the selected shutter time at any one time.

The output from the sensor 1 is applied to the AD converter 3 only when the analog gate 2 is gated on by each pulse in the pulse train T5, being converted by the AD converter 3 to a digital signal which as the brightness information BV is directed to computer 4. Further, the film speed selector 5 is operated to set the sensitivity of the used film, thereupon the signal generator 6 delivers a signal representative of the selected film sensitivity which as the film speed information SV is directed to computer 4. Responsive to these informations RV, BV and SV, the computer 4 derives an effective diaphragm aperture value in the form of a signal which is directed through the opened gate 13 to AND gates 11 and 12. The signal, though prohibited from passing through AND gate 12 due to the "and" condition thereof, passes through AND gate 11 to the diaphragm aperture value register 20. Thereupon, the register is caused to set the diaphragm control circuit 22 to an operative condition for formation of the derived diaphragm aperture, and to actuate the drive circuit 21 for displaying a set of digits representative of the derived diaphragm aperture valve. The drive circuit 21 is identical in display operation to the drive circuit 17. If this derived diaphragm aperture value falls outside the predetermined dynamic range of diaphragm aperture control, the detector 23 produces an output corresponding to the derivation of the diaphragm aperture value from the dynamic range, and this output is fed back through OR gate 15 to shutter time register 16 to modify the preselected shutter time.

In the diaphragm aperture preselection automatic exposure range, the system of FIGS. 1 and 2 operates in a similar manner to that in the shutter time preselection automatic exposure range, provided that an effective shutter time is determined in conformance to the preselected diaphragm aperture value. Accordingly, a detailed explanation in this regard is deemed unnecessary.

The operation of the system of FIGS. 1 and 2 in manual exposure range is as follows. At first, the operator throws a battery switch not shown to apply the timing pulse trains T1 through T4 to the display drive circuits 17 and 21, and apply the timing pulse train T5 to the analog gate 2. Next, the operator turns a shutter dial and diaphragm control ring to select a desired shutter time and diaphragm aperture. The shutter time selector 7a and the diaphragm aperture selector 7b then deliver respective signals. Responsive to the signal from the selector 7a, the signal generator 8 generates a certain number of pulses which depends upon the selected shutter time, and the pulses as the shutter time information TV are directed both to the computer 4 and to the OR gate 15. The OR gate 15 passes the pulses to the register 16 which, in turn, operates to set the shutter control circuit 18 to an operative condition for formation of the preselected shutter time and to actuate the drive circuit 17 for the digit readout device. Responsive to the signal from the selector 7b, the signal generator 9 generates a certain number of pulses which depends upon the selected diaphragm aperture value, and the pulses as the diaphragm aperture information AV are directed both to the computer 4 and to the OR gate 19. The OR gate passes the register 20 which in turn operates to set the diaphragm control circuit 22 to an operative condition for formation of the predetermined diaphragm aperture, and to actuate the drive circuit 21 for the digit readout device. Further, the brightness information BV and film speed information SV are applied from the sensor 1 and the film speed selector 5 to the computer 4. The signals from the selectors 7a and 7b are also applied to the AND gate 10, thereupon the "and" condition of the AND gate 10 is removed to operate the prohibition gate 13 and to render operative the null signal display circuit 14. As a result, the output from the computer 4 is prohibited from passing through the gate 13 to AND gates 11 and 12. The computer 4 is designed to provide a null signal when the combination of the preselected shutter time and diaphragm aperture value is suitable for correct exposure. When the null signal is applied to the circuit 14, the circuit 14 provides a luminous indication in the view finder.

It will be seen from the foregoing description that the present invention contemplates the time-displacement of the time interval during which the sensor 1 provides a light value of the brightness information BV to the computer 4 from the time interval during which the readout device 40 is permitted to form the indicia, by a time interval long enough not to cause the light from the activated readout device 40 to influence the light-metering operation of the sensor 1. In this manner, the light value can be sensed with improved accuracy.

While a presently-preferred embodiment of this invention has been described in detail and illustrated schematically in the accompanying drawings, it is to be understood that various modification may be adopted without departing from the scope of this invention. For example, the readout device may be constructed with light-emittable diodes or liquid crystal, and various arrangements of the readout device in the view finder besides that shown in FIG. 4 are possible.

What is claimed is:

1. An exposure value display system for a camera of TTL type comprising in combination:
   a. a finder optical system, said finder optical system being associated with an objective lens;
   b. sensor means arranged in said finder optical system to receive light passing through said objective lens;
   c. first control means for controlling the light-metering operation of said sensor means;
   d. display means arranged in said finder optical system to display an exposure value;
   e. second control means for controlling the display operation of said display means; and
   f. pulse generator means connected to said first and second control means for supplying output pulses which control the operation periods of said first and second control means in time-displaced relation with respect to each other in sequence.

2. An exposure value display system according to claim 1, wherein said sensor means includes a photodiode.

3. An exposure value display system according to claim 1, wherein said display means includes light-emitting diodes.

4. An exposure value display system according to claim 1, wherein said sensor means is connected to an exposure control means, said exposure control means deriving said exposure value in correspondence with the light value sensed by said sensor means.

5. An exposure value display system according to claim 1, wherein said pulse generator means includes a timing pulse generator.

* * * * *